(12) United States Patent
De Miceli et al.

(10) Patent No.: US 7,374,067 B2
(45) Date of Patent: May 20, 2008

(54) HANDHELD EXTRUDER WELDING DEVICE (75) Inventors: Guiseppe De Miceli, Menziken (DE); Hans Arnold, Kägiswil (CH); Adolp Niederberger, Kaegiswil (CH)

(73) Assignee: LEISTER Process Technologies, Sarnen (CH)

( * ) Notice: Subject to any disclaimer, the term of this patent is extended or adjusted under 35 U.S.C. 154(b) by 321 days.

(21) Appl. No.: 11/219,041

(22) Filed: Sep. 2, 2005

(65) Prior Publication Data

US 2006/0051442 A1  Mar. 9, 2006

(30) Foreign Application Priority Data

Sep. 8, 2004  (EP) .................................. 04021266

(51) Int. Cl.
B65D 88/54  (2006.01)
(52) U.S. Cl. .................... 222/146.6; 222/324; 222/333; 222/413
(58) Field of Classification Search ............. 222/146.1, 222/146.5, 146.6, 413, 324, 333, 504
See application file for complete search history.

(56) References Cited

U.S. PATENT DOCUMENTS 4,183,448 A * 1/1980 Nash ........................... 222/413
4,387,834 A * 6/1983 Bishop ........................ 222/413
4,561,569 A * 12/1985 Dziki ........................ 222/146.5
4,804,110 A * 2/1989 Sperry et al. ............. 222/146.6
5,153,008 A * 10/1992 Koch ........................ 222/146.5

FOREIGN PATENT DOCUMENTS

DE    28 23 171        11/1979
DE    41 19137 C1      2/1993

OTHER PUBLICATIONS

European Search Report for corresponding Application No. 04021266.4 dated Mar. 9, 2005.

* cited by examiner

Primary Examiner—Yogendra N. Gupta
Assistant Examiner—Thu Khanh T. Nguyen
(74) Attorney, Agent, or Firm—Renner, Otto, Boisselle & Sklar, LLP (57) ABSTRACT

Handheld extruder welding device for welding thermoplastic synthetic materials, including an extruder screw, a drive system for the extruder screw in an axial extension of the extruder screw, and a hot air unit with a blower, where the blower and the drive system are integrated in a housing including several parts, and where a cooling body with air inlets is located on the housing on the screw side. This cooling body transfers the axial and radial forces between the drive system and the screw cylinder and supports the housing. In this handheld extruder welding device, all drive components are integrated in one housing which makes it suitable for robust use and a long service life. Its design with a cooling body as the support base for the entire device represents a special function.

20 Claims, 8 Drawing Sheets

HANDHELD EXTRUDER WELDING DEVICE

TECHNICAL FIELD

This invention concerns a handheld extruder welding device for welding thermoplastic synthetic materials, including an extruder screw, a drive system for the extruder screw in an axial extension of the extruder screw, and a hot air unit for producing hot air for pre-heating.

BACKGROUND OF THE INVENTION

Such handheld extruder welding devices are familiar devices, and are used primarily for welding plastic panels or similar objects. The known plastic welding devices consist essentially of a handheld drill serving as the drive system and a removable attachment for this drill. In the attachment, a strand of plastic in the shape of a plastic wire that is supplied via one or several feed channels and a feed device is first chopped up, and is then heated in a conveying device—usually in form of a worm conveyor—and a plasticizing device so that the chopped plastic material reaches a plastic state and is then expelled as welding material through a welding shoe. The hot air unit includes an air generating device in the shape of an internal blower (or a connection for a hose coming from an external blower) as well as a heating device. As an example, we refer to DE-A-28 23 171.

Although it is possible to produce all these handheld extruder welding devices inexpensively by using a handheld drill, their design is not robust enough for a long-term use.

SUMMARY OF THE INVENTION

The invention therefore addresses the problem of proposing a new handheld extruder welding device that is of compact design, where the drive system and the heating unit (at least in part), a control unit including display and operating elements, as well as elements for handling the device can be integrated, and where the thermal loads on the individual units are optimized.

According to the invention, this problem is solved by a handheld extruder welding device having the characteristics specified in the main claim. Additional advantageous design variants are described in the sub-claims.

According to the invention, the handheld extruder welding device has a housing including several parts. On the screw side, it has a cooling body with air inlets; this body serves as the central mechanical support base that holds the housing walls, the drive system, the screw cylinder, and the hot air unit. Because of its arrangement in the handheld extruder welding device, the cooling body represents a central base component that supports the remaining housing components and absorbs the torsion forces produced by the extruder screw. For this purpose, the cooling body is engineered to be sufficiently stable, is usually made of metal—preferably aluminum—and is joined with the housing, the gear unit, and the screw cylinder in such fashion that it is capable of transmitting the axial and radial forces between the drive system and the screw cylinder. Placing the cooling body on the side of the housing that faces the extruder screw has the advantage that excessive heating of the plastic welding wire to be fed into the housing is thereby prevented, and that the cooling of the gear unit can be accomplished with measures that are simple in terms of engineering and manufacturing aspects. By arranging the cooling body in a location that is close to the gear unit, direct cooling of the hard-working gear unit via the air inlets becomes feasible. In addition, this will also cool the motor behind it. Integrating at least part of the hot air unit, i.e. at least the blower of the hot air unit, and the drive system including motor and gear unit in one housing allows the compact grouping of the essential components, which makes the device as a whole easier to handle and more versatile when it comes to attaching accessories. In principle, instead of a blower inside the housing, it is also possible to provide only a connection for an external blower, so that the air can be supplied via a hose, for example.

In accordance with a preferred design of the invention, the cooling body inlcudes at least two parts that are locked together. This has the advantage that the same locking action also holds the extruder screw in position in a gear unit flange, which also strengthens the connection of the housing and the gear unit. If, with a cooling body including two parts, the cooling body is divided lengthwise in two halves, the parts may be designed as mirror symmetric parts.

According to another design of the invention, special advantages result if the gear unit is surrounded at least partially by the cooling body, and is at least in partial thermal contact with it. On the one hand, this provides for direct cooling of the gear unit due to this contact, and, on the other hand, cooling is also produced by convection due to the cold air entering via the air inlets.

In another design, at least one feed channel for the welding wire that opens into the feed zone of the extruder screw is located in the cooling body. It thereby assumes an additional cooling function for the plastic welding wire, ensuring that, during the feeding process, the welding wire is not heated to the point where it would already start melting in the welding wire channel. Preferably, even the insertion opening for the feed channel is located on the cooling body. This makes guiding the wire easier and also means less expense when manufacturing the handheld extruder welding device.

In order to prevent, as much as possible, the welding wire from twisting, the feed channel opens into a wire feed sleeve surrounding the extruder screw; this sleeve has at least one slanted guide groove that contains at least one pointed ridge running in longitudinal direction.

The invention makes it possible to create a handheld extruder welding device that, from the perspective of performance and durability of the device, provides not just optimal cooling but also optimal heating of the areas where this is desired. Its design as a whole makes for a compact handheld extruder welding device that can be easily handled by the operator. The use of the cooling body as a basic component also allows the attachment of handling elements, such as handles, rubber bumpers, etc.

Below, the invention is explained in detail with the help of a design variant.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
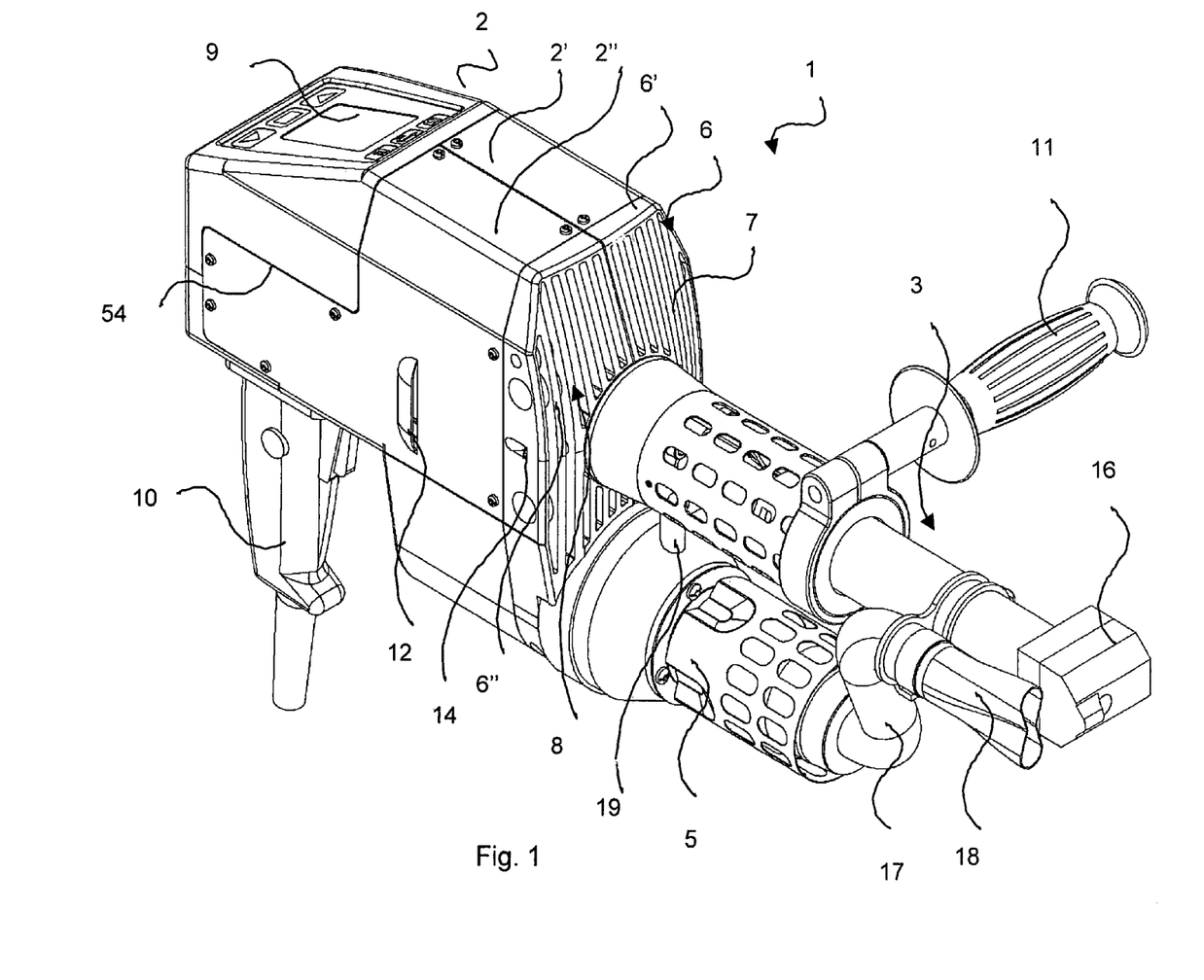
FIG. 1 shows a perspective view of the handheld extruder welding device from the front.
Figure 2:
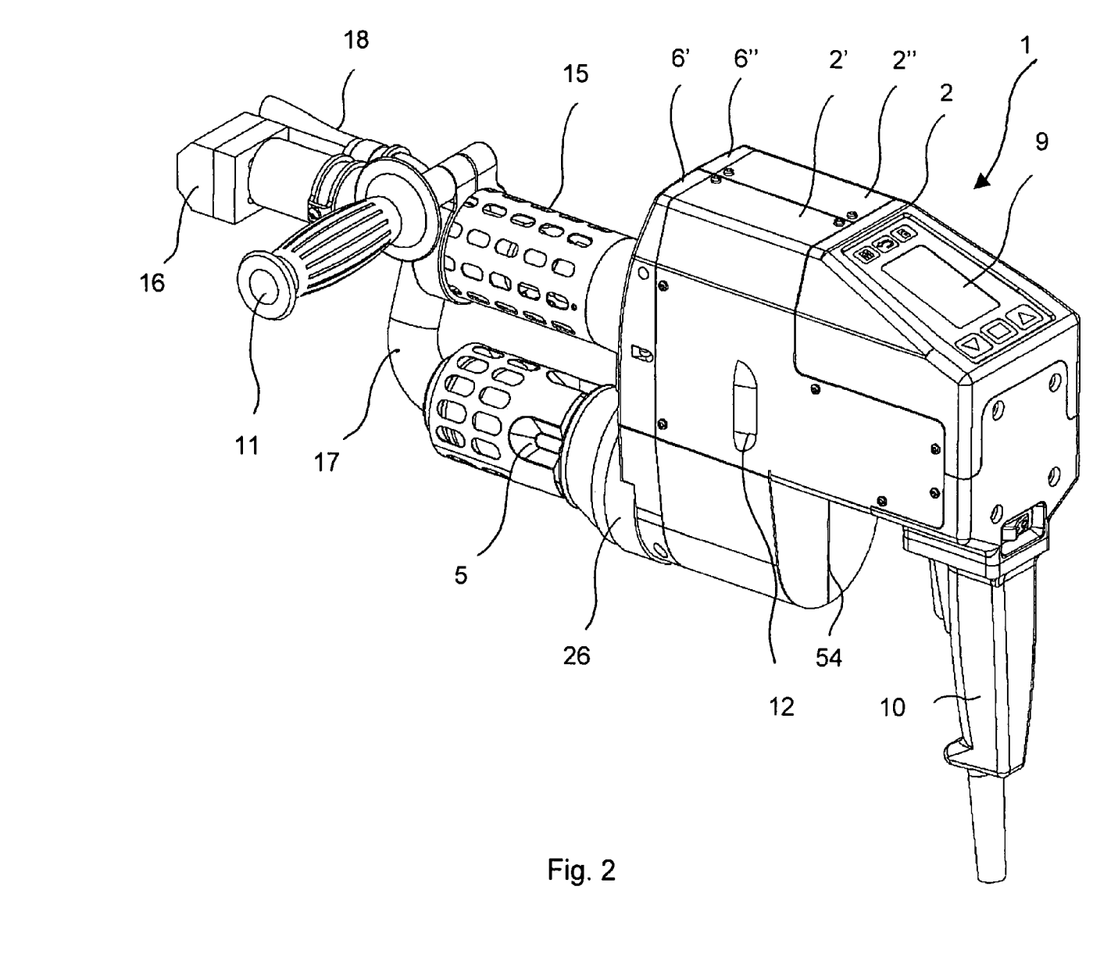
FIG. 2 shows a perspective view of the handheld extruder welding device in FIG. 1 from the opposite side and from the rear.

The FIGS. 1 and 2 show the handheld extruder welding device 1 from various angles with a housing 2 where the screw housing 3 surrounding the extruder screw 4 (FIG. 3) and the heater housing 5 are protruding from its front side. On the side facing the extruder screw 4 and the heater housing 5, the housing 2 has a two-part cooling body 6 with cooling fins 7 and air inlets 8. As shown by the seams 54, the housing 2 includes of two housing halves 2' and 2" that are supported by the cooling body 6 as the base component. An electronic display 9 and a handle 10 are located on the housing. An additional handle 11 for the other hand of the operator is attached to the screw cylinder 3. On their sides, both housing halves 2', 2" each have an outlet opening 12 for the warm air coming from the drive motor 13 (FIG. 13) of the extruder screw 4 that is located inside. Each side of the cooling body 6 has a feed opening 14 for the welding wire. In a first section following the housing 2, the screw cylinder as well as the heater housing 5 are surrounded by a perforated housing cover 15. A welding shoe 16 that can be exchanged and adapted as needed is attached to the end of the screw cylinder 3. The heater housing 5 opens into a curved hot air line 17 ending in a welding seam preheating nozzle 18 that is located close to the welding shoe 16. FIG. 1 also shows a cold air branch 19 that supplies cold air to the welding wire feeding system.

Figure 3:
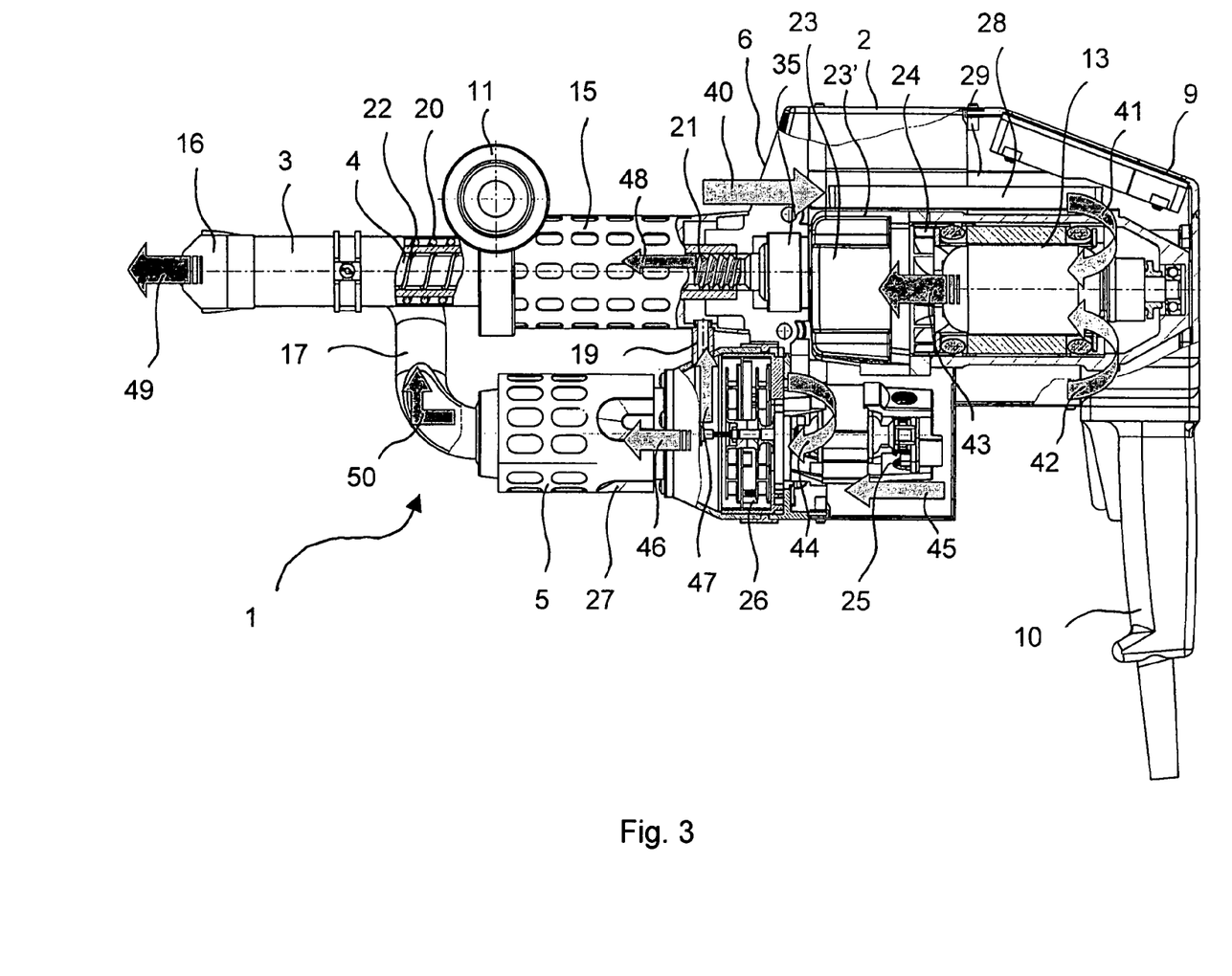
FIG. 3 shows a longitudinal section with drive system and the hot air unit with blower integrated in the housing.

FIG. 3 shows the internal configuration of the handheld extruder welding device 1 in detail, with the air flow indicated by the arrows. The extruder screw 4 in the screw housing 3 is surrounded by a spiral tube heating cartridge 20 along the shaft. On the side facing the housing 2, the extruder screw has a conventional worm thread 21 for feeding the welding wire, which has a different pitch than the worm thread 22 in the plasticizing zone. In the axial direction relative to the extruder screw, the housing 2 contains a gear unit 23 that is connected to the drive motor 13 installed behind it. On the gear unit side, a ventilator fan 24 is installed on the drive motor 13.

Below the gear unit 23 in the housing 2, a blower motor 25 is located, driving a two-stage blower 26 that blows the air through a subsequent heating device with an electric heating element into the hot air line 17. The heating element may consist of a conventional heating element with heating coils, for example, and may be placed in the airflow. The electrical controls 28 for the handheld extruder welding device are located in the area of the electronic display 9 and above the motor 13 and the gear unit 23, and are shown as a circuit board with electronic components.

The cold air for the drive motor 13 is taken in through air inlets 8 between the cooling fins 7, as indicated by the arrow 40, and flows through the channel 29 above the control unit 28 to the rear face of the drive motor 13 (arrow 41). At the same time, additional cold air is supplied to the drive motor 13 from the cooling body 6 area (arrow 42) through the housing. The hot air 43 of the drive motor 13 exits laterally from the openings 12 in the housing 2.

Air (arrow 44) for the two-stage blower 26 also flows through appropriate air inlets 8 between the cooling fins 7 into the housing 2. The arrow 45 indicates the air already heated by the blower motor 25 that flows through the interior of the housing 2 to the two-stage blower. The air 46 exiting from the blower 26 on the pressure side is fed into the heating device 27. Part of it, 47, is passed to the area of the feed channel and the worm thread 21 via the cold air branch 19 in order to prevent undesirable heating of the welding wire. The arrow 50 in the figure indicates the hot air moved from the heating device 27 through the hot air line 17. Hot air 48 can be exhausted from the feed zone through the openings of the perforated housing 15 surrounding the extruder screw. Arrow 49 indicates the pre-heating air for the welding seam that exits from the pre-heating nozzle 18 at the end of the hot air line 17.

FIG. 3 also shows the gear unit 23 with a bell-shaped gear unit housing 23' with a gear unit output shaft 35 located in the cooling body 6 that presses against and holds the shaft (not shown) of the extruder screw 4. The cooling body is directly connected with the gear unit housing 23', and in this manner also provides stability for the drive motor 13 that is located behind it and is also supported on the opposite side of the housing. In addition, the extruder cover 3 and the housing halves 2', 2" are also attached to the cooling body 6. Finally, at its lower end, the cooling body 6 at least partially encloses the blower 26 that is also connected with the cooling body 6. Therefore, the cooling body 6 acts as a central support base that has a decisive influence on the entire structure of the handheld extruder welding device. On the one hand, it serves as the support element for the housing halves 2', 2" and the drive system including the gear unit 23 and the drive motor 13; on the other hand, it supports the screw cylinder 3 and the blower 26, thereby absorbing the axial and radial forces generated by the rotating extruder screw 4 and the material between the extruder screw 4 and the screw cylinder 3.

Figure 4:
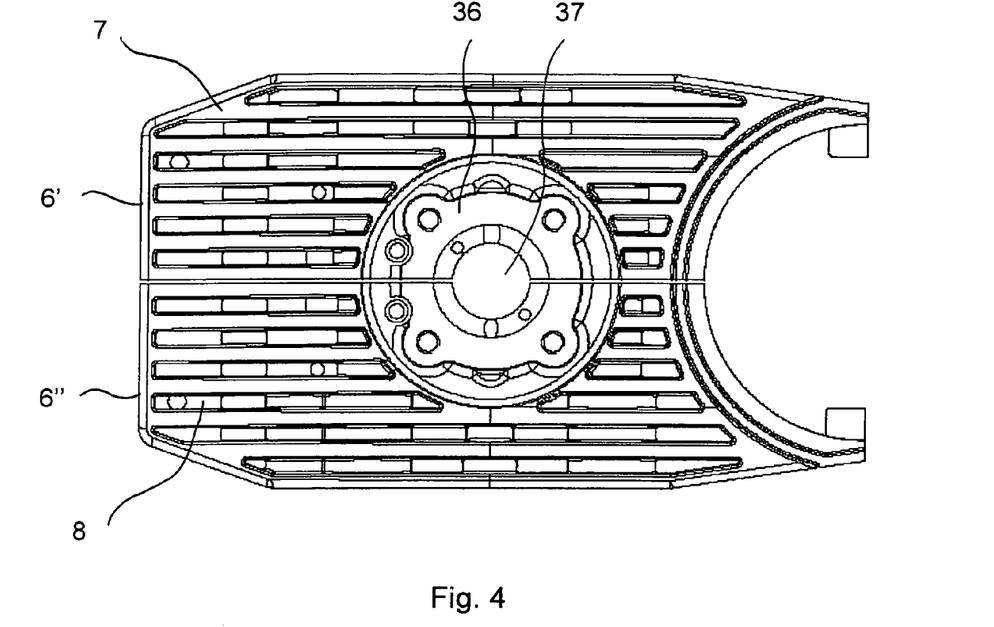
FIG. 4 shows a top view of the front of the cooling body.
Figure 5:
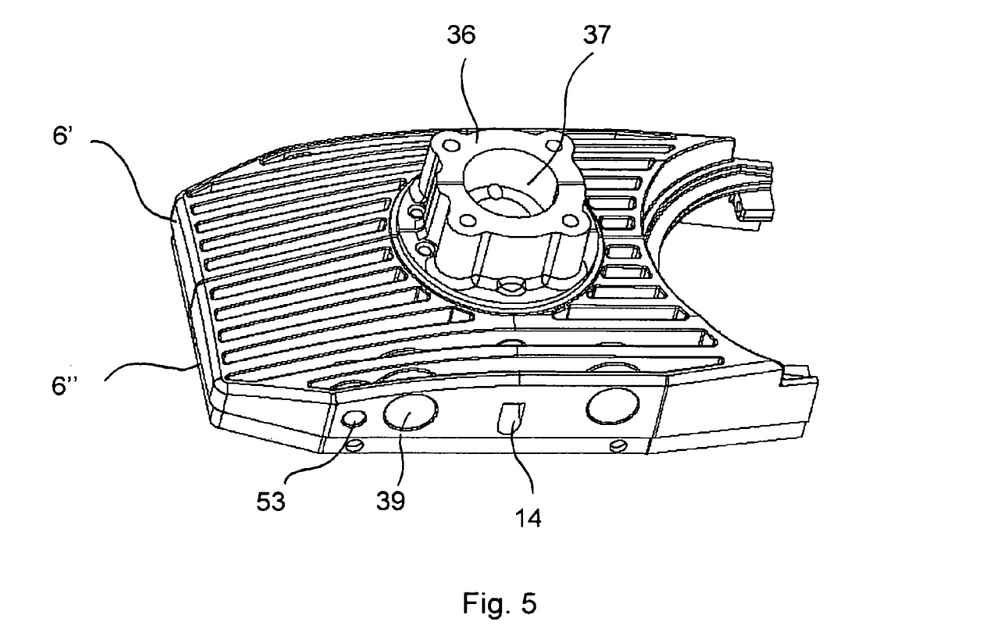
FIG. 5 shows a perspective view of the front of the cooling body.
Figure 6:
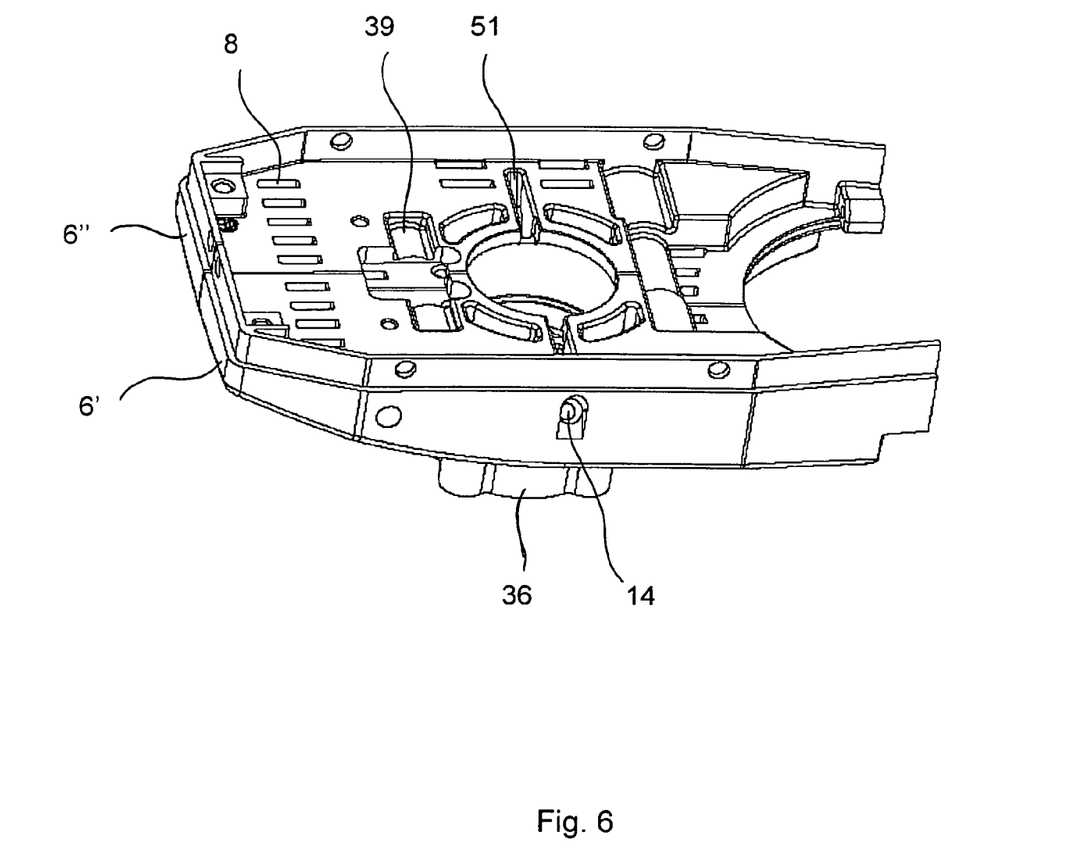
FIG. 6 shows a perspective view of the rear of the cooling body.

FIGS. 4 to 6 show various views of the cooling body 6. In the top view in FIG. 4, the cooling fins 7 with the air inlets 8 can be seen clearly. The cooling body includes two parts and has two mirror symmetric cooling body halves 6' and 6". In a central location in the cooling body 6, a cooling body stub 36 protruding from the surface of the cooling body 6 is provided that serves to support and attach the worm cylinder 3. The central bore 37 accepts the feed sleeve 32 into which, in turn, the extruder screw 4 can be inserted.

Figure 8:
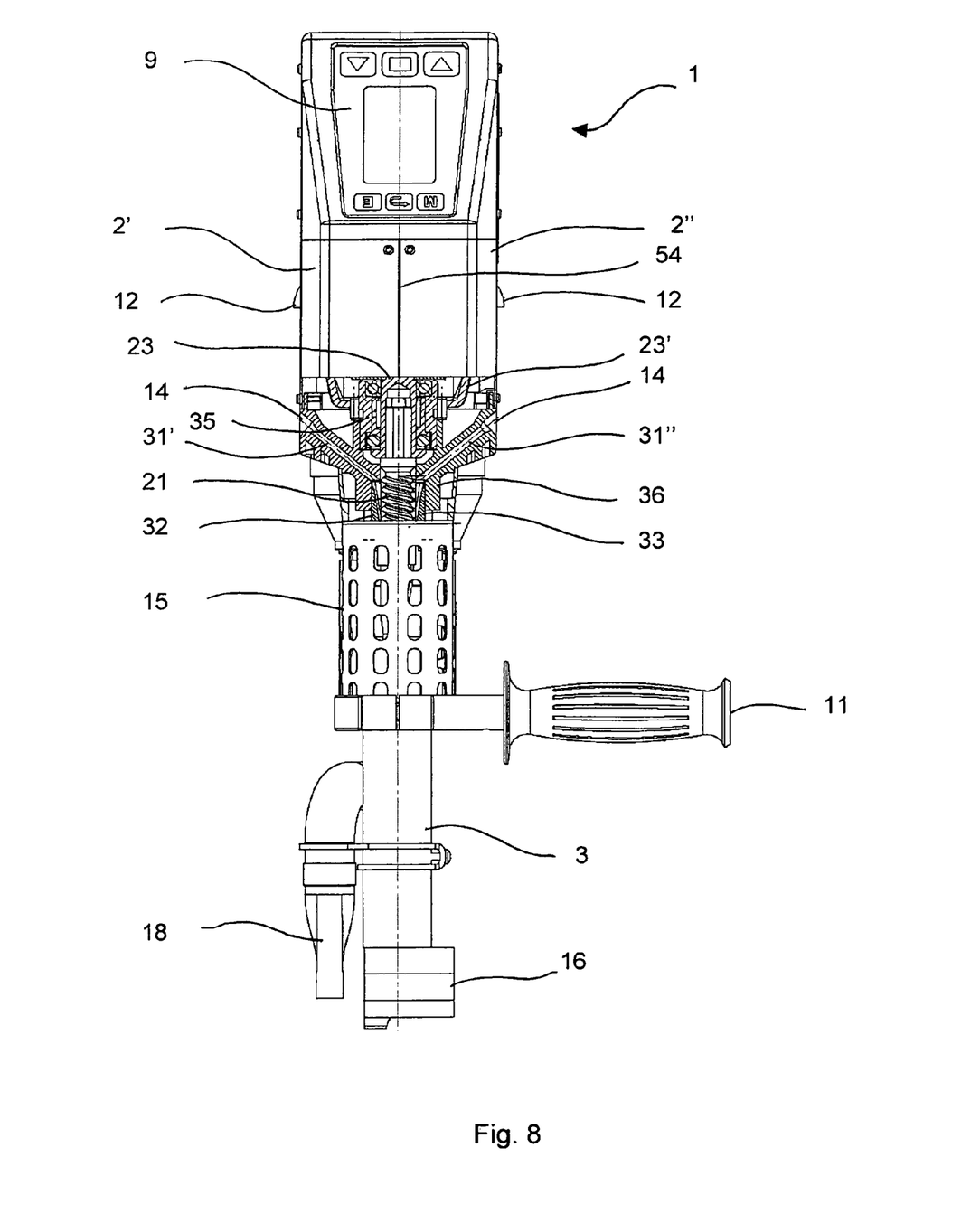
FIG. 8 shows a top view of the handheld extruder welding device with a section through the cooling body.

FIGS. 5 and 6 show the side openings 14 for the welding wire; in this design variant, they have different diameters in order to permit the use of different welding wire materials. The course of the feed channels is shown in FIG. 8. FIG. 5 also shows the exit opening 38 of the feed channel running through the cooling body half 6" in the bore 37 of the cooling body stub 36 that opens into the feed sleeve 33 (not shown in this figure).

FIG. 5 shows two bores 39 on the long sides of the cooling body 6 that accept bolts for locking the two cooling body halves 6' and 6" together. On the one hand, this locking action has the effect of turning the cooling body 6 into a stable base component of the handheld extruder welding device; on the other hand, as mentioned before, it presses together the gear unit housing 23, producing a mechanical as well as thermal contact in this area. The bores 53 may be used for attaching handles or rubber buffers, for example.

FIG. 6 shows the air inlets 8 as well as the bores 39 for the bolts. The cross-wise slots 51 serve to engage the pins that prevent twisting.

Figure 7:
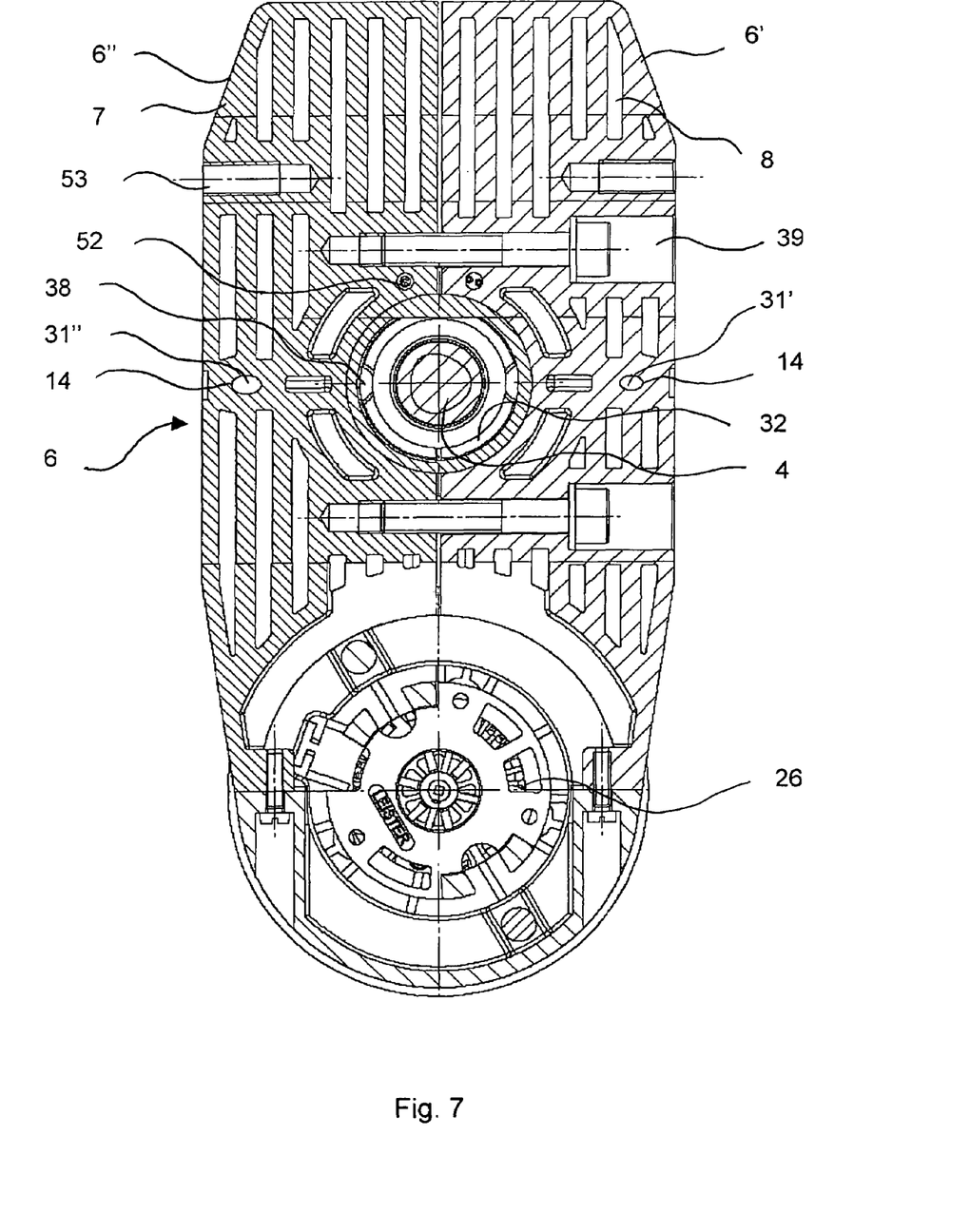
FIG. 7 shows a longitudinal section of the cooling body.

The longitudinal section through the cooling body 6 with the cooling body halves 6' and 6" in FIG. 7 shows the arrangement of the cooling fins 7, the air inlets 8, the extruder screw 4 in the feed sleeve 32, the feed channels 31' and 31" with the openings 14, as well as, in the lower section, the configuration of the blower 26 on the cooling body 6. The passages 52 for the electrical wires are also located in the cooling body 6.

The top view in FIG. 8 shows the runs of the different feed channels 31' and 32" relative to the feed sleeve 32 that has a slanted guide groove in which the welding wire is fed to the feed worm thread 21. The figure also shows a part of the bell-shaped gear unit housing 23 that is locked in by the cooling body halves 6' and 6" in the area of the gear output 35 and is prevented from twisting by the pins (not shown).

Figure 9:
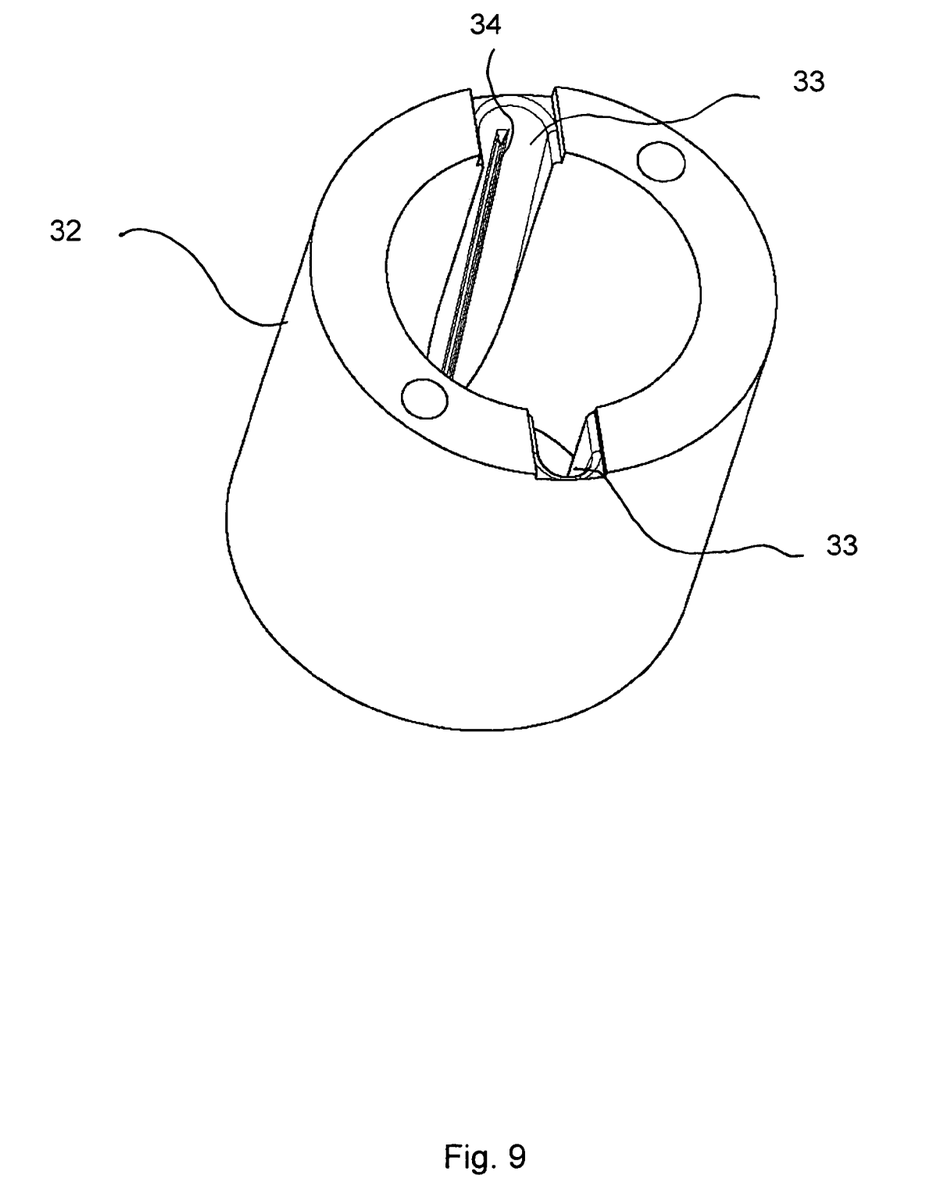
FIG. 9 shows a perspective front view of an insertion sleeve.

The perspective front view of the feed sleeve 32 in FIG. 9 shows that the guide groove 33 runs at an angle and has a ridge 34 running in longitudinal direction. At the end facing the inserted welding wire, the ridge 34 ends in a sharp point, acting like a cutting blade in that location. This has the effect that when the welding wire is inserted, it is not moved, or moved only to a minimal extent, by the rotation of the extruder screw 4 so that the welding wire coming off a roll enters the welding wire opening 14 in an almost straight line. The usual twisting or looping of the wire is thereby eliminated, thanks to the design and guidance of the welding wire in the cooling body 6 and in the following feed sleeve 32. Depending on how the guide groove 33 is made, the feed sleeve 32 may consist of one or two parts.

The handheld extruder welding device proposed by the invention represents a compact and robust handheld extruder welding device that is optimized in terms of cooling and, due to the special arrangement of the cooling body, offers a stable structure that is simple and inexpensive at the same time.

The invention claimed is:

1. A handheld extruder welding device for welding thermoplastic synthetic materials, comprising an extruder screw with a screw cylinder, a drive system for the extruder screw in an axial extension of the extruder screw, and a hot air unit for producing hot air for pre-heating, further including a housing enclosing the drive system and comprising several parts that has a cooling body with air inlets on the screw side supplying the drive system with cooling air, where the cooling body is engineered as a central support base component that holds the housing walls, the drive system, the screw cylinder, and the hot air unit.

2. A handheld extruder welding device according to claim 1, wherein the cooling body includes at least two parts, and that the parts of the cooling body are locked together.

3. A handheld extruder welding device according to claim 2, wherein the gear unit of the drive system is surrounded, at least in part, by the cooling body, and is, at least in part, in thermal contact with it.

4. A handheld extruder welding device according to claim 1, wherein the cooling body contains at least one feed channel for the welding wire that ends in the feed zone of the extruder screw.

5. A handheld extruder welding device according to claim 2, wherein the cooling body contains at least one feed channel for the welding wire that ends in the feed zone of the extruder screw.

6. A handheld extruder welding device according to claim 3, wherein the cooling body contains at least one feed channel for the welding wire that ends in the feed zone of the extruder screw.

7. A handheld extruder welding device according to claim 4, wherein the feed opening for the feed channel is located on the cooling body.

8. A handheld extruder welding device according to claim 5, wherein the feed opening for the feed channel is located on the cooling body.

9. A handheld extruder welding device according to claim 6, wherein the feed opening for the feed channel is located on the cooling body.

10. A handheld extruder welding device according to claim 4, wherein the feed channel ends in a wire feed sleeve surrounding the extruder screw, and the feed sleeve has a least one slanted guide groove that has at least one pointed ridge running in longitudinal direction.

11. A handheld extruder welding device according to claim 5, wherein the feed channel ends in a wire feed sleeve surrounding the extruder screw, and the feed sleeve has a least one slanted guide groove that has at least one pointed ridge running in longitudinal direction.

12. A handheld extruder welding device according to claim 6, wherein the feed channel ends in a wire feed sleeve surrounding the extruder screw, and the feed sleeve has a least one slanted guide groove that has at least one pointed ridge running in longitudinal direction.

13. A handheld extruder welding device according to claim 7, wherein the feed channel ends in a wire feed sleeve surrounding the extruder screw, and the feed sleeve has a least one slanted guide groove that has at least one pointed ridge running in longitudinal direction.

14. A handheld extruder welding device according to claim 8, wherein the feed channel ends in a wire feed sleeve surrounding the extruder screw, and the feed sleeve has a least one slanted guide groove that has at least one pointed ridge running in longitudinal direction.

15. A handheld extruder welding device according to claim 9, wherein the feed channel ends in a wire feed sleeve surrounding the extruder screw, and the feed sleeve has a least one slanted guide groove that has at least one pointed ridge running in longitudinal direction.

16. A handheld extruder welding device according to claim 1, wherein assembly and carrying elements can be attached to the cooling body.

17. A handheld extruder welding device according to claim 2, wherein assembly and carrying elements can be attached to the cooling body.

18. A handheld extruder welding device according to claim 3, wherein assembly and carrying elements can be attached to the cooling body.

19. A handheld extruder welding device according to claim 4, wherein assembly and carrying elements can be attached to the cooling body.

20. A handheld extruder welding device according to claim 7, wherein assembly and carrying elements can be attached to the cooling body.

* * * * *